United States Patent Office 3,442,594
Patented May 6, 1969

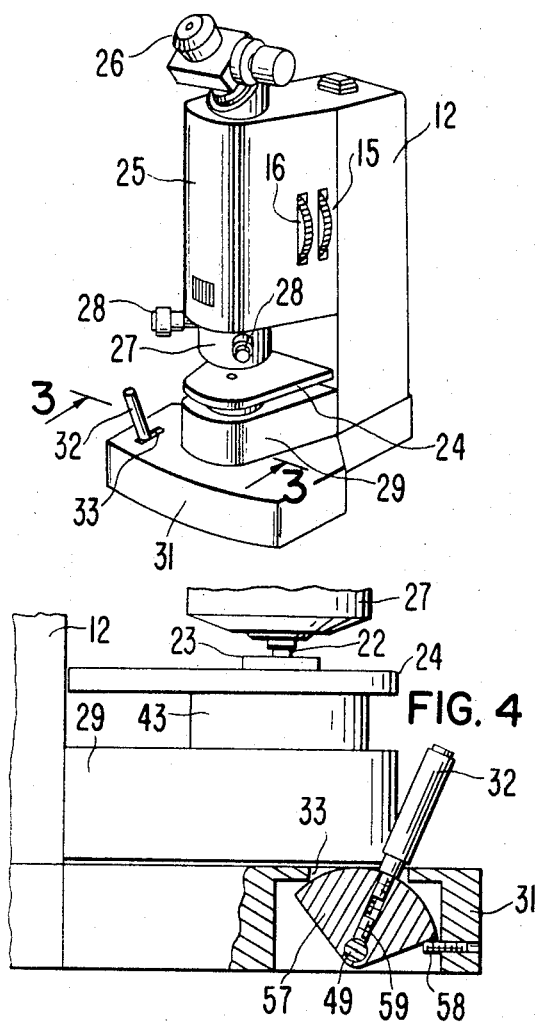
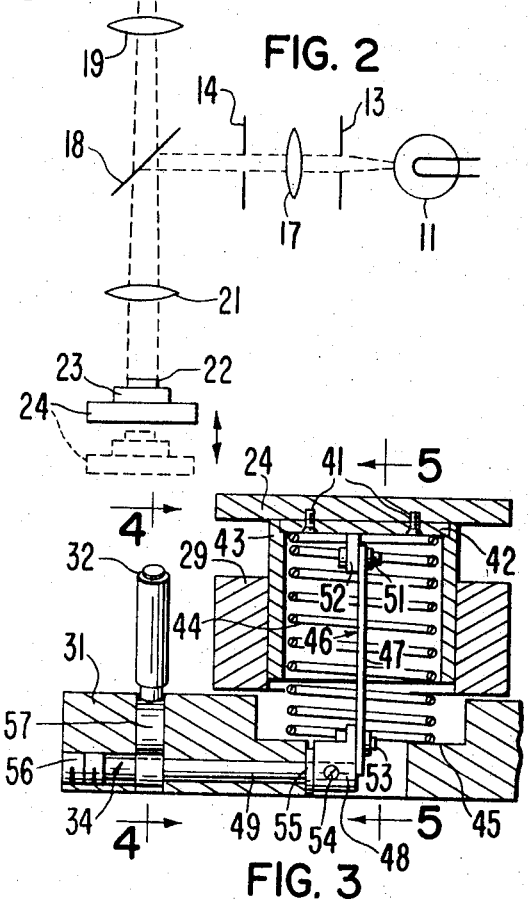
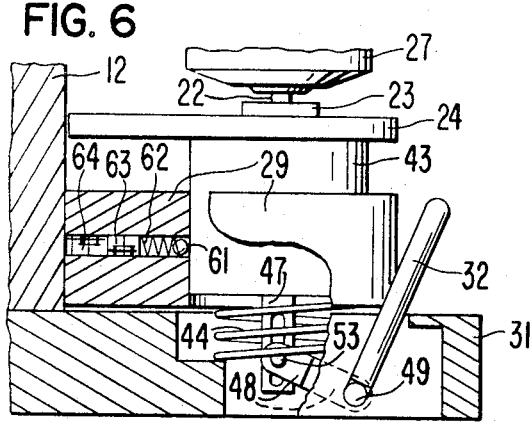
INVENTORS
CHARLES D. MINARD
ARTHUR B. FRANCIS

3,442,594
MULTIPLE BEAM INTERFEROMETER
Charles D. Minard, Palo Alto, and Arthur B. Francis, Los Altos Hills, Calif., assignors to Varian Associates, Palo Alto, Calif., a corporation of California
Filed Aug. 11, 1966, Ser. No. 571,811
Int. Cl. G01b 9/02
U.S. Cl. 356—109
11 Claims

ABSTRACT OF THE DISCLOSURE

A multiple beam interferometer having a spring-loaded platen for maintaining the specimen in contact with an optical flat under constant pressure. A lever is provided for withdrawing the platen from the flat for insertion or removal of the specimen and for releasing the platen which then moves the specimen into contact with the flat. A velocity brake controls the speed at which the platen approaches the optical flat. A second brake provides enough friction to hold the platen in a position removed from the optical flat until the lever is moved to permit the platen to move the specimen into contact with the flat.

---

The present invention relates generally to multiple beam interferometers, and more particularly to a multiple beam interferometer wherein a specimen is urged against an optical flat with a predetermined pressure and is brought into contact with the optical flat from a loading position with a predetermined maximum velocity regardless of the rate at which an operator actuates a mechanism for bringing the specimen and optical flat into contact.

In multiple beam interferometers, a specimen being analyzed for microscopic variations in surface thicknesses, on the order of 30 to 20,000 Angstroms, is brought into contact with an optical flat or Fizeau plate. The Fizeau plate and specimen being tested have a predetermined air wedge angle between them along the propagation direction of the monochromatic light utilized for analyzation purposes. Because of the precision measurements involved and the minuteness of the surface variations of interest, it is imperative that a constant angle exist between the optical flat and specimen and that consistency exist between measurements of various specimens. Otherwise, the interference fringes do not provide meaningful indications of the thickness of the surface being measured.

While it is imperative for a predetermined pressure to exist between the specimen and Fizeau plate, it is also important that the specimen be brought gently into contact with the plate from a position where it is loaded onto a carrying member or platen. If the specimen and Fizeau plate are forcibly brought into contact with each other at a relatively large velocity, there is a great possibility of damage being done to the optical plate and specimen, whereby the Fizeau plate must be replaced and/or the specimen destroyed. With most presently available multiple beam interferometers, however, an anomaly exists between these two criteria. In particular, if an operator brings the specimen into contact with the Fizeau plate with sufficient force to maintain the required pressure, the force is frequently so severe that either the specimen or plate is broken. On the other hand, if sufficient force is not utilized for bringing the specimen and Fizeau plates together, the pressure required to maintain the air wedge angle constant and consistent for different specimens is not achieved.

According to the present invention, the specimen and Fizeau plate are brought into contact with the same force regardless of the velocity with which an operator activates a control member. Sufficient force is maintained between the specimen and plate to maintain the air wedge angle consistent between different specimens when the operator activates the control mechanism to its furthest extent. The velocity with which the specimen and plate initially engage each other is always sufficiently low to prevent any damage from being incurred by either the specimen or plate.

The closing velocity between the specimen and Fizeau plate is controlled by positioning the specimen on a platen that is normally urged upwardly by a compression spring. The platen movement is controlled by a motion mechanism comprised of a slotted pin linkage which is driven by a manually activated lever. The platen motion mechanism is normally braked so that the force of the compression spring is overcome by the braking mechanism. Thereby, when the platen is lowered, for removal and insertion of a specimen, it remains in situ even though the operator is not exerting any manual force against the control lever.

When it is desired to bring the specimen and Fizeau plate into contact, the operator activates the lever, whereby a pin engaging the slotted linkage is raised and the compression spring urges the platen and specimen upwardly. As the lever is rotated, the braking force against the platen mechanism is released and the compression spring is the sole drive for the platen and specimen in the direction of upward movement. Since the spring compression force is the sole motive means for the platen and specimen in the direction of upward movement, the velocity with which the specimen is brought into contact with the Fizeau plate is not related to the speed with which the operator turns the lever, provided the lever is activated at a velocity greater than the natural velocity with which the spring urges the platen upwardly.

If the operator should rotate the lever very slowly, whereby the slotted linkage overcomes the force of the frictional brake at a velocity less than the velocity at which the platen is urged upwardly by the spring, consant pressure is nevertheless maintained between the specimen and Fizeau plate when they are brought into contact. Such constant pressure is maintained because the operator is instructed to activate the control lever to its farthest extent, i.e., to a point where it can no longer be rotated and the pin is positioned above the bottom of the slot with the specimen and Fizeau plate in contact. With the pin located away from the slot lower extremity and the specimen positioned against the Fizeau plate, the force between the specimen and plate is constant since the brake has been completely released and the compression spring serves as the means for urging the plate and specimen into contact.

It is, accordingly, an object of the present invention to provide a multiple beam interferometer in which a specimen carrying member is urged against an optical flat with constant pressure, regardless of the speed with which an operator manually activates a control mechanism for carrying and translating the specimen.

It is a further object of the present invention to provide a multiple beam interferometer wherein an operator is not required to bring a specimen and Fizeau plate into contact with great care and precision while avoiding problems associated with: (1) destroying the flat and/or specimen; and (2) maintaining the airwedge angle constant while a specimen is being analyzed and consistent between various specimens.

Another object of the present invention is to provide a mechanical activating means for bringing a specimen into contact with a Fizeau plate with constant force, whereby the possibility of destroying the specimen or the optical flat with which it comes into contact is substantially obviated.

Still an additional object of the present invention is to provide, in a multiple beam interferometer, a mechanical activating system for bringing a specimen into contact with a Fizeau plate, whereby the air wedge angle between the Fizeau plate and specimen is consistently maintained during an examination and the same angle is achieved for plural tests.

The above and still further objects, features and advantages of the present invention will become apparent upon consideration of the following detailed description of one specific embodiment thereof, especially when taken in conjunction with the accompanying drawings, wherein:

FIGURE 1 is a perspective view of a preferred embodiment of the multiple beam interferometer of the present invention;

FIGURE 2 is a schematic diagram of the optical elements employed in a multiple beam interferometer according to the present invention;

FIGURE 3 is a sectional view through the mechanism utilized for selectively raising and lowering a specimen to be analyzed with the multiple beam interferometer of the present invention, taken though lines 3—3 of FIGURE 1;

FIGURE 4 is a sectional view of the platen activating mechanism, taken thorugh the lines 4—4 of FIGURE 3;

FIGURE 5 is a sectional view taken though the lines 5—5 of FIGURE 3; and

FIGURE 6 is a sectional view of a second embodiment of the platen lowering and raising mechanism according to the present invention.

Reference is now made to FIGURES 1 and 2 of the drawings to provide a general description of the multiple beam interferometer of the present invention. The multiple beam interferometer comprises a monochromatic light source 11, preferably of the sodium vapor type, which is located in vertically extending housing 12. Light from source 11 is directed through variable opening ireses 13 and 14, the diameters of which are controlled by knurled disks 15 and 16. Irises 13 and 14 respectively control the size of the optical field directed onto a specimen being tested and the brightness of the light impinging on the specimen.

Positioned between irises 13 and 14 is double convex lens 17 for collimating the light emanating from source 11 into a beam of parallel rays directed onto semi-transparent mirror 18. Half of the light directed onto semi-transparent mirror 18 is directed through the mirror, and is lost. The remaining light impinging on mirror 18 from monochromatic source 11 is directed to double convex lens 21 where it is collimated and directed onto the intersection between Fizeau plate 22 and specimen 23.

The surface on specimen 23 has thickness variations generally on the order of 30 to 20,000 Angstroms. Typical of examples of the surface thickness variations are the complex surfaces of crystals, thin film deposits, and razor blade edges.

Specimen 23 is carried on platen 24 that is translated between the position shown in full lines and the dotted line position illustrated beneath Fizeau plate or optical flat 22.

With platen 24 translated to the lower illustrated position, specimens can be placed on and removed from the platen while the specimens are analyzed when the platen is raised.

To establish the interference patterns required to determine the microscopic thickness variations on the surface of specimen 23 being analyzed, an air wedge is formed between the Fizeau plate and specimen by tilting the Fizeau plate about an axis in the horizontal plane. Thereby, with the platen in the raised position, light is refracted from the intersection of Fizeau plate 22 and specimen 23 in accordance with the microscopic surface variations of the specimen and is directed back to distal viewing lens 19 via lens 21 and semi-transparent mirror 18.

The manner and apparatus for establishing the air wedge is described fully in the copending application Ser. No. 536,240 of Arthur B. Francis, commonly assigned with the present application.

Each of irises 13 and 14, adjusting disks 15 and 16, lenses 17 and 21, together with semi-transparent mirror 18, is located within housing 25 that is attached to and extends horizontally from housing 12. Mounted at the top of housing 25 is eyepiece 26, wherein lens 19 is located, while the Fizeau plate 22 and its housing 27 extend from the lower end of housing 25. Extending horizontally from housing 27 is a pair of actuating screws 28, utilized for controlling the tilt angle of optical flat 22, as described fully in the copending Francis application.

Vertically adjustable platen 24 and a portion of the control mechanism therefor are carried on hollow block 29, while the block and housing 12 are positioned on and secured to platform 31. At one edge of platform 31 is lever 32, rotatable in slot 33 from a position almost at the front of platform 31 to approximately the center thereof, for controlling the vertical position of platen 24.

In normal operation, platen 24 is raised to bring the upper surface of specimen 23 into a slight, but definite and predetermined, contact with the lower surface of Fizeau plate 22. The air wedge formed between Fizeau plate 22 and the surface of the specimen 23 being viewed causes an interference fringe pattern to be projected through semi-transparent mirror 18 to viewing lens 19. The light refracted from the air wedge interferes with light projected directly on mirror 18 from monochromatic source 11, causing fringe patterns indicative of the thickness of the film surface on the specimen 23 to be produced. The spacing between adjacent lines of the interference pattern seen through lens 19 is directly related to the microscopic thickness of the films on specimen 23 being analyzed.

Subsequent to a complete analyzation of the surface of specimen 23, platen 24 is lowered by rotating lever 32 toward the center of platform 31. The platen and specimen remain in the lowered position by means of a brake until the lever is rotated toward the forward portion of platform 31. With platen 24 in the lowered condition, specimen 23 can be removed and a new specimen inserted on the platen for analyzation.

The apparatus for selectively lowering and raising platen 24, maintaining the platen in the lowered position and for urging the platen with a constant, predetermined pressure against Fizeau plate 22 is now described specifically in conjunction with FIGURES 3–5. Platen 24 is fixedly secured by screws 41 to disk 42, which is in turn welded to sleeve 43. Sleeve 43 is driven vertically relative to the interior circular bore within housing or bearing block 29 and lubrication is provided between the sleeve and bearing block to enable the parts to move freely relative to each other.

Compression spring 44, having its lower end positioned on ledge 45 of housing 31 and its upper end abutting against the bottom surface of disk 42, normally urges platen 24 upwardly with a predetermined force. The force of compression spring 44 is overcome by a braked linkage 46 that comprises slotted bar 47, bell crank 48, shaft 49 and lever arm 32. The upper end of slotted bar 47 is rotatable about pin 51 that is fixedly mounted to the lower surface of disk 42 by tab 52. In the slot of bar 47, is positioned pin 53 that is rotatably carried on bell crank 48. Bell crank 48 is fixedly secured to shaft 49 by set screw 54 to be rotatable with the shaft. The adjacent surfaces of bell crank 48 and platform 31 are separated by washer 55 to minimize friction and wear.

The end of shaft 49 opposite from bell crank 48 abuts tightly against set screw 56, and nylon plug 34 that projects inwardly into platform 31 in the horizontal plane along an axis coaxial with shaft 49. The surface of set screw 56 abutting nylon plug 34 against shaft 49 serves as a brake for the shaft so that the shaft can only be rotated in response to movement of lever 32 secured to the shaft by set screw 59. Hence, as lever 32 is rotated to the left, as viewed in FIGURE 5, shaft 49 is rotated in a counterclockwise direction. In response to counterclockwise rotation of shaft 49, bell crank 48 is also rotated in a counterclockwise direction, as viewed in FIGURE 5, and pin 53 is raised within the slot of bar 47. In an opposite manner, pin 53 is translated downwardly when lever 32 is rotated to the right, as viewed in FIGURE 5.

To limit the upward movement of platen 24, cam 57, shaped as a segment of a circle, is mounted and secured by set screw 59 for rotation with shaft 49 and has extending through it the threaded portion of lever 32. Set screw 58 is inserted horizontally through the side wall of platform 31 to engage the flat surface of cam 57, to serve as a limit stop for the movement of lever 32 in the right-hand direction, as viewed in FIGURE 4. Set screw 58 is inserted within its bore to a position so that it comes in contact with the planar surface of cam 57 at a point to limit the upward movement of platen 24 to a plane slightly above the lower surface of Fizeau plate 22. Hence, an operator of the multiple beam interferometer of the present invention is prevented from raising the platen considerably beyond the Fizeau plate, whereby the Fizeau plate is not broken, but always raises the platen and the specimen with a predetermined pressure against the plate because he is instructed always to rotate lever 32 until it cannot be turned additionally, i.e., until the planar surface of cam 57 engages set screw 58.

In response to rotation of lever 32 towards the right, as viewed in FIGURE 5, pin 53 is translated downwardly to engage the lowest portion of the slot in bar 47. Continued rotation of lever 32 causes pin 53 to translate lever 47, as well as disk 42 and platen 24 secured thereto, in a downward direction until the bottom surface of platen 24 engages the upper surface of housing 29. When platen 24 comes into contact with housing 29, the operator removes his hand from lever 32 and the platen remains in situ by virtue of the braking force of set screw 56 and nylon plug 34, on shaft 49. The braking force of set screw 56 is sufficiently great to overcome the tendency of spring 44 to urge disk 42 and platen 24 in an upward direction. With platen 24 in its lowered position, specimen 23 can be removed and a new specimen placed on the platen.

After the new specimen has been placed on the upper surface of platen 24, the operator rotates lever or handle 32 towards the left, as viewed in FIGURE 5. Rotation of lever 32 to the left results in counterclockwise rotation of shaft 49 and raising of pin 53 from the lowermost portion of the slot in bar 47. As pin 53 moves away from the lowermost portion of the slot in bar 47, spring 44 urges platen 24 in an upward direction, toward Fizeau plate 22. As lever 32 is rotated additionally, the restraining force on spring 44 is removed, whereby specimen 23 is urged against Fizeau plate 22 with a predetermined force, controlled by the stored energy in spring 44.

Hence, regardless of the velocity with which lever 32 is rotated, the specimen is urged against the Fizeau plate with a predetermined force necessary to attain the air wedge, as desired. The force exerted by compression spring 44 is, however, sufficiently small to prevent a severe impact between specimen 23 and Fizeau plate 22. If the operator rotates lever 32 with great velocity, the spring 44 urges specimen 23 against Fizeau plate 22 with a force that is insufficient to cause any damage to either the optical flat 22 or the specimen. On the other hand, if the operator rotates lever arm 32 slowly, spring 44 urges specimen 23 against Fizeau plate 22 with the pressure required to provide a constant air wedge angle between optical flat 22 and the specimen 23 and to maintain the angle consistent when different specimens are analyzed. To insure that the operator establishes a constant force between plate 22 and specimen 23, whereby the air wedge angle is consistent, lever 32 is rotated until it cannot go any farther, whereby the planar surface of cam 57 abuts against set screw 58 and pin 53 is moved away from the bottom of the slot in bar 47 when specimen 23 and plate 22 contact.

Reference is now made to FIGURE 6 of the drawings wherein a spring and ball velocity brake is advantageously employed for variably controlling the speed with which platen 24 and specimen 23 are upwardly driven against Fizeau plate 22. The speed controller of FIGURE 6 comprises nylon ball 61 which is urged against the exterior surface of sleeve 43 by compression spring 62. The degree to which spring 62 is compressed is controlled by the inward extent of set screw 63, the end of which presses against the end of spring 62 opposite from where ball 61 is located. Each of ball 61, spring 62, and set screw 63 is located within threaded bore 64 and extends horizontally through housing 29.

To control the force exerted by ball 61 against sleeve 43, set screw 63, which is preferably of the Allen head type, is rotated in threaded bore 64 against compression spring 62. If it is desired for platen 24 and specimen 23 to be raised with a relatively large velocity, set screw 63 is rotated away from sleeve 43, whereby ball 61 exerts a decreased force against the sleeve. In an opposite manner, set screw 63 is rotated towards sleeve 43 if it is required that the platen and specimen rise with a very low velocity. The utility of the spring and ball velocity brake is that non-precision platen raising springs 44 and normal fits between the sleeve 43 and bearing block housing 29 can be employed.

What is claimed is:

1. A multiple beam interferometer for analyzing microscopic surface variations of a specimen comprising a transparent optical flat, a platen for carrying said specimen, means connected to said platen for selectively translating it in a vertical direction so that the specimen contacts said flat and is lowered so that it can be removed from the platen, a control member attached to said means for translating for enabling the vertical movement of said means for translating, said means for translating including means for urging said specimen against said flat with substantially the same force irrespective of the magnitude of force exerted by said control member on said means for translating as the platen is translated into contact with said flat, a monochromatic light source, means for directing light from said source through said flat to said specimen, means connected to said optical flat for establishing an air wedge angle between said specimen and flat, and an optical system positioned in said system to produce a magnified image in response—has been inserted therefor to light from said source reflected from said specimen.

2. The multiple beam interferometer of claim 1 wherein said means for selectively translating includes a slotted linkage having one end connected to said platen, a pin riding in the slot of said linkage, said pin at a first location in said slot when said platen is removed from said flat and at a second location when said platen contacts said flat, and means coupled between said control member and said pin for translating said pin between said locations for enabling the platen to be translated towards and away from contact with said flat.

3. The interferometer of claim 2 further including means for maintaining said platen in situ, against the force of said urging means, when no force is applied to said control means.

4. The interferometer of claim 3 wherein said means for maintaining comprises a brake frictionally engaging said means for selectively translating.

5. The interferometer of claim 3 further including means for variably adjusting the speed with which said platen is enabled to be raised.

6. The interferometer of claim 5 wherein said means for variably adjusting comprises a frictional element urged against said means for selectively translating, said frictional element being urged by a compression spring, and means for varying the compression exerted by said spring on said frictional element.

7. The multiple beam interferometer of claim 1 further including means for limiting the upward extent of movement of said platen.

8. The multiple beam interferometer of claim 7 wherein said means for limiting comprises a cammed surface coupled for movement with said control means, and a stop positioned to abut against said cammed surface in response to said platen being raised to its farthest extent.

9. The multiple beam interferometer of claim 7 wherein said means for selectively translating includes a slotted linkage having one end connected to said platen, a pin riding in the slot of said linkage, said pin at a first location in said slot when said platen is removed from said flat and at a second location when said platen contacts said flat, and means coupled between said control member and said pin for translating said pin between said location for enabling the platen to be translated towards and away from contact with said flat.

10. The interferometer of claim 8 further including means for maintaining said platen in situ, against the force of said urging means, when no force is applied to said control means and means for variably adjusting the speed with which said platen is enabled to be raised.

11. The interferometer of claim 10 wherein said means for selectively translating includes a bearing block connected to said platen, wherein said coupling means includes a shaft secured at one end to said control member, and a bell crank secured at the other end of said shaft, said pin secured to said bell crank to be translated in said slot when the control member is moved; wherein said means for maintaining comprises a brake frictionally engaging said shaft; and wherein said means for varibly adjusting includes frictional element urged against said bearing block, said frictional element being urged by a compression spring, and means for varying the compression exerted by said spring on said frictional element.

References Cited

UNITED STATES PATENTS 2,962,929  12/1960  Stodiek _____ 350—84

RONALD L. WIBERT, *Primary Examiner.*

T. MAJOR, *Assistant Examiner.*

U.S. Cl. X.R.

108—145; 350—81, 84, 86

UNITED STATES PATENT OFFICE
CERTIFICATE OF CORRECTION

Patent No. 3,442,594     Dated  May 6, 1969

Inventor(s)   Charles D. Minard et al.

It is certified that error appears in the above-identified patent and that said Letters Patent are hereby corrected as shown below:

Column 6, line 52, after "said" delete "system" and insert -- interferometer --; lines 53 and 54, cancel "-has been inserted therefor".

Signed and sealed this 27th day of June 1972.

(SEAL)
Attest:

EDWARD M. FLETCHER, JR.
Attesting Officer

ROBERT GOTTSCHALK
Commissioner of Patents